United States Patent
Le et al.

(10) Patent No.: US 10,726,006 B2
(45) Date of Patent: Jul. 28, 2020

(54) QUERY OPTIMIZATION USING PROPAGATED DATA DISTINCTNESS

(71) Applicant: Microsoft Technology Licensing, LLC, Redmond, WA (US)

(72) Inventors: Wangchao Le, Redmond, WA (US); Yongchul Kwon, Kirkland, WA (US); Marc Todd Friedman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 513 days.

(21) Appl. No.: 15/640,336

(22) Filed: Jun. 30, 2017

(65) Prior Publication Data
US 2019/0005092 A1    Jan. 3, 2019

(51) Int. Cl.
G06F 16/20      (2019.01)
G06F 16/2453    (2019.01)
G06F 16/22      (2019.01)
G06F 17/10      (2006.01)

(52) U.S. Cl.
CPC .... G06F 16/24535 (2019.01); G06F 16/2246 (2019.01); G06F 16/2453 (2019.01); G06F 16/24542 (2019.01); G06F 16/24545 (2019.01); *G06F 17/10* (2013.01)

(58) Field of Classification Search
CPC ............. G06F 16/2246; G06F 16/2453; G06F 16/24535; G06F 16/24542; G06F 16/24532; G06F 16/24545
USPC ......................................................... 707/713
See application file for complete search history.

(56) References Cited

U.S. PATENT DOCUMENTS

| | | | |
|---|---|---|---|
| 8,166,047 B1 * | 4/2012 | Cohen | G06F 16/245 707/748 |
| 9,152,691 B2 | 10/2015 | Rhodes et al. | |
| 9,177,025 B2 | 11/2015 | Bensberg et al. | |
| 9,342,557 B2 | 5/2016 | Kornacker et al. | |

(Continued)

OTHER PUBLICATIONS

Curcio, Matt, "Sketch of the Day: K-Minimum Values", https://research.neustar.biz/2012/07/09/sketch-of-the-day-k-minimum-values/, Published on: Jul. 9, 2012, 8 pages.

(Continued)

*Primary Examiner* — Vincent F Boccio
(74) *Attorney, Agent, or Firm* — Workman Nydegger

(57) ABSTRACT

Query optimization using of a query that is compiled into a query tree. The optimization is efficiently performed by using a distinct value estimation data structure (e.g., a KMV synopsis) that represents within an interval distinctness of values that are generated based on data within an interval, even if the resultant data from a subinterval is considered. Various candidate query trees are evaluated, with distinct value generation data structures being propagated for parent nodes based on the distinct value generation data structures of its child node(s). Propagation operations correlate to the operation represented by the parent node in the query tree. The optimizer uses the propagated distinct value estimation structure in order to evaluate the number of distinct values of data that would result from execution of the candidate query tree at least at the corresponding operations (and not just based on the distinct values of the input data).

19 Claims, 5 Drawing Sheets

(56) References Cited

U.S. PATENT DOCUMENTS

| | | | |
|---|---|---|---|
| 9,454,574 B2* | 9/2016 | Cheng | G06F 16/24545 |
| 2008/0120275 A1 | 5/2008 | Cruanes et al. | |
| 2008/0147599 A1* | 6/2008 | Young-Lai | G06F 16/24532 |
| 2009/0192980 A1 | 7/2009 | Beyer et al. | |
| 2010/0257181 A1 | 10/2010 | Zhou et al. | |
| 2011/0082854 A1* | 4/2011 | Eidson | G06F 16/24544 707/714 |
| 2014/0095472 A1 | 4/2014 | Lee et al. | |
| 2015/0278306 A1* | 10/2015 | Cheng | G06F 16/24545 707/714 |

OTHER PUBLICATIONS

Beyer, et al., "Distinct-Value Synopses for Multiset Operations", In Journal of Communications of the ACM, vol. 52, Issue 10, Oct. 2009, pp. 87-95.

Giroire, Frederic, "Order statistics and estimating cardinalities of massive data sets", In Journal of Discrete Applied Mathematics, vol. 157, Issue 2, Jan. 28, 2009, pp. 406-427.

Yang, Fangjin, "Fast, Cheap, and 98% Right: Cardinality Estimation for Big Data", http://druid.io/blog/2012/05/04/fast-cheap-and-98-right-cardinality-estimation-for-big-data.html, Published on: May 4, 2012, 6 pages.

Cormode, et al., "Methods for finding frequent items in data streams", In International Journal on Very Large Data Bases, vol. 19, Issue 1, Feb. 2010, pp. 3-20.

Bar-Yossef, et al., "Counting distinct elements in a data stream", In Proceedings of the 6th International Workshop on Randomization and Approximation Techniques, Sep. 13, 2002, pp. 1-10.

Beyer, et al., "On Synopses for Distinct-Value Estimation Under Multiset Operations", In Proceedings of the ACM SIGMOD international conference on Management of data, Jun. 12, 2007, pp. 199-210.

Babcock, et al., "Towards a Robust Query Optimizer: A Principled and Practical Approach", In Proceedings of the ACM SIGMOD International Conference on Management of Data, Jun. 14, 2005, pp. 119-130.

Chaudhuri, Surajit, "An Overview of Query Optimization in Relational Systems", In Proceedings of the Seventeenth ACM SIGACT-SIGMOD-SIGART Symposium on Principles of Database Systems, May 1, 1998, 10 Pages.

"International Search Report and Written Opinion Issued in PCT Application No. PCT/US18/035244", dated Jul. 26, 2018, 13 Pages.

* cited by examiner

QUERY OPTIMIZATION USING PROPAGATED DATA DISTINCTNESS

BACKGROUND

Computing systems and associated networks have greatly revolutionized our world. The interconnection of such computing systems into networks has resulted in explosive growth in the ability to communicate data ushering in what is now called the "information age". The explosion continues with the advent of datacenters and cloud computing environments, and other distributed environment, in which robust amounts of processing resources can be applied against massive amounts of data. Such data may be stored and organized in, for instance, a database.

Users can issues the query against their database so as to retrieve relevant information to the user. The database front-end receives the query and compiles the query into a tree of operators (also called a "query tree") that reflects the semantics of the query as posed. A query optimizer takes the initial query tree and optimizes the query tree for more efficient execution against the database. The optimized query tree is then used to select or generate an execution plan, which is then used to execute the query against the database. The result of the execution is then returned to the user.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the performance of query optimization using of a query that is compiled into a query tree of operators representing parallel query operations. For instance, such query operations may be executed in a massively distributed computing cluster. The query optimization takes into consideration various candidate optimizations of the query tree, and evaluates those candidate query trees to determine whether the candidate query tree would improve performance. As an example only, each of the execution alternatives may be assigned an artificial execution burden factor. The optimizer then selects the most efficient optimization by execution burden factor. In accordance with the principles described herein, the evaluation takes into consideration number of distinct values that result from one or more query operations in order to identify whether a candidate query tree is an improvement over other candidate query trees. The optimization is efficiently performed by using a combinable distinct value estimation data structure that represents the distinctness by a small group of hash values for a massive distributed dataset. For instance, the distinct value estimation data structure might be a k minimum value (KMV) synopsis.

In order to perform optimization of the query tree, various candidate query trees are evaluated, with distinct value generation data structures being generated for parent nodes based on the distinct value generation data structures of its child node(s). For instance, the generated data structures may be recursively generated and maintained for parent nodes based on the distinct value generation data structures of the child node(s) Propagation operations may have a correlation to the operation represented by the parent node. Thus, distinct value estimation data structures are propagated at least part of the way from the leaf nodes up the candidate query trees.

The query optimizer may use the propagated district value estimation structure in order to 1) evaluate the number of distinct values of data that would result from execution of the candidate query tree at least at the corresponding operations (and not just based on the distinct values of the input data to the query); 2) estimate the data volume induced by the operation; 3) select the degree-of-parallelism for the operation during parallel execution. Together, the distinct value and its propagation with the data structure help the query optimizer estimate whether or not the candidate query tree is an acceptable optimized form of the initial query tree since it takes into consideration an estimation of the number of distinct values with high confidence after data would be operated upon as part of the execution of proposed optimized query trees.

The principles described herein may be efficiently performed on massively distributed data, in which case the data associated with a leaf node of a query tree may be distributed. The data structure supports common set operations like union and intersection. If distributed, a distinct value estimation data structure for each of multiple subportions of the data for that leaf node may be propagated into a distinct value estimation data structure for the whole leaf node. Accordingly, the principles described herein may be used to perform query optimization of queries that are to be performed even on distributed data.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
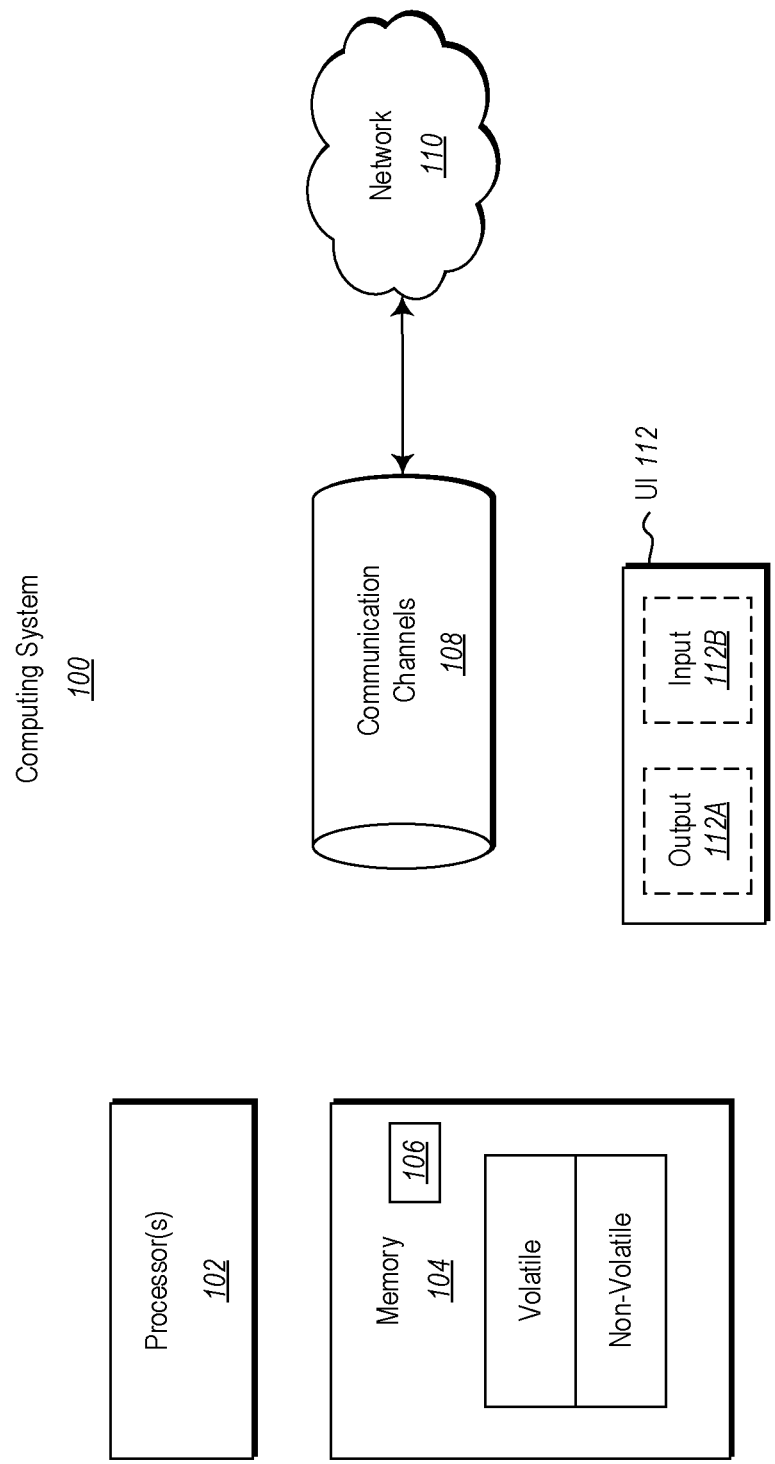
FIG. 1 illustrates an example computer system in which the principles described herein may be employed.

At least some embodiments described herein relate to the performance of query optimization using of a query that is compiled into a query tree of operators representing parallel query operations. For instance, such query operations may be executed in a massively distributed computing cluster. The query optimization takes into consideration various candidate optimizations of the query tree, and evaluates those candidate query trees to determine whether the candidate query tree would improve performance. As an example only, each of the execution alternatives may be assigned an artificial execution burden factor. The optimizer then selects the most efficient optimization by execution burden factor. In accordance with the principles described herein, the evaluation takes into consideration number of distinct values that result from one or more query operations in order to identify whether a candidate query tree is an improvement over other candidate query trees. The optimization is efficiently performed by using a combinable distinct value estimation data structure that represents the distinctness by a small group of hash values for a massive distributed dataset. For instance, the distinct value estimation data structure might be a k minimum value (KMV) synopsis.

In order to perform optimization of the query tree, various candidate query trees are evaluated, with distinct value generation data structures being generated for parent nodes based on the distinct value generation data structures of its child node(s). For instance, the generated data structures may be recursively generated and maintained for parent nodes based on the distinct value generation data structures of the child node(s) Propagation operations may have a correlation to the operation represented by the parent node. Thus, distinct value estimation data structures are propagated at least part of the way from the leaf nodes up the candidate query trees.

The query optimizer may use the propagated district value estimation structure in order to 1) evaluate the number of distinct values of data that would result from execution of the candidate query tree at least at the corresponding operations (and not just based on the distinct values of the input data to the query); 2) estimate the data volume induced by the operation; 3) select the degree-of-parallelism for the operation during parallel execution. Together, the distinct value and its propagation with the data structure help the query optimizer estimate whether or not the candidate query tree is an acceptable optimized form of the initial query tree since it takes into consideration an estimation of the number of distinct values with high confidence after data would be operated upon as part of the execution of proposed optimized query trees.

The principles described herein may be efficiently performed on massively distributed data, in which case the data associated with a leaf node of a query tree may be distributed. The data structure supports common set operations like union and intersection. If distributed, a distinct value estimation data structure for each of multiple subportions of the data for that leaf node may be propagated into a distinct value estimation data structure for the whole leaf node. Accordingly, the principles described herein may be used to perform query optimization of queries that are to be performed even on distributed data.

Because the principles described herein operate in the context of a computing system, a computing system will be described with respect to FIG. 1. Then, the principles of query optimization will be described with respect to FIGS. 2 through 9B.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

In a typical distributed network computing system, a processor may execute computer-executable instructions and read data from storage medium. Ranked by the efficiency of reading data, fetching data from local RAM is fastest, followed by local disk and then shipping data across network. Ranked by the scarcity and cost of storage medium, local RAM is limited, expensive and under high usage contention, local disk comes next, and remote storage is ample and hence ideal for a program to store data across network. Given the aforementioned Scarcity vs. Execution Burden Factor matrix, a more optimized program operated in the aforementioned network computing system should minimize the data movement across network when possible and if not, spill data to remote disks to leverage faster storage medium remotely.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
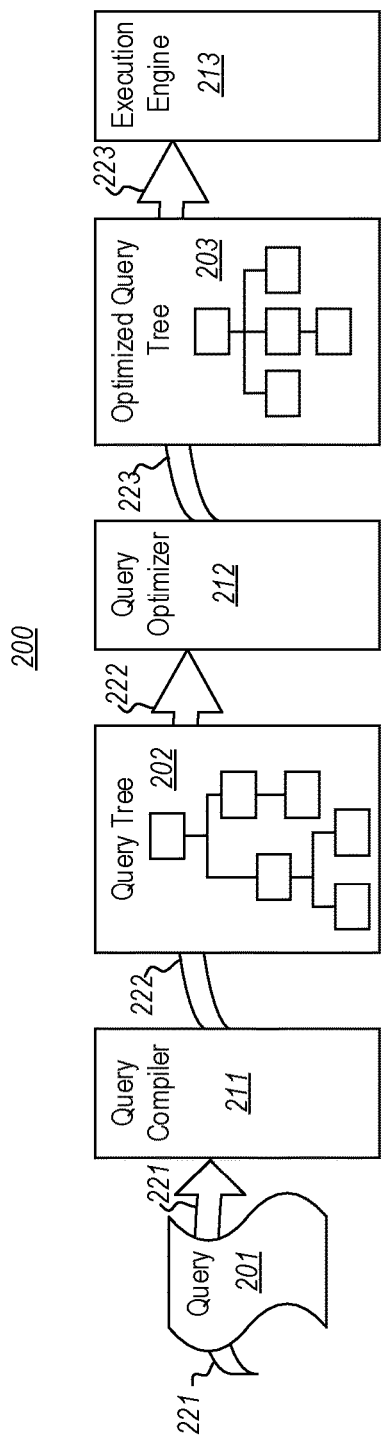
FIG. 2 illustrates a query processing environment in which a query is compiled into a query tree, the query tree is optimized, and the optimized query tree is provided to an execution engine.

FIG. 2 illustrates a query environment 200 in which query optimization is performed. The query environment 200 may be executed on, for instance, the computing system 100 of FIG. 1, or multiple of such computing systems. In one embodiment, the query environment 200 exists in a cloud computing environment.

First, a query is received (as represented by the query 201 and the arrow 221) by a query compiler 211. The query compiler 211 generates a compiled query tree 202 that represents the parsed operations represented in the query 201. The compiled query tree 202 is a query tree of operators representing parallel query operations. The compiled query tree 202 is then provided (as represented by arrow 222) to a query optimizer 212. The query optimizer 212 optimizes the received query tree 202 to generate an optimized query tree 203 that is anticipated to be faster executing than the original received query tree 202.

The optimized query tree 203 may perform the same (or close enough) functions as would the original compiled query tree 202, except with better performance. For instance, the optimized query tree 203 may perform faster, user fewer resources, and/or provide any other benefit during execution. The optimized query tree 203 is then provided (as represented by arrow 223) to an execution engine 213 for execution of the optimized query tree. For instance, the execution engine 213 may select and or generate an execution plan that is used to execute the optimized query tree and generate query results.

A query tree (such as the query tree 202) is composed of relational operators. A relational operator defines a relation from one or more of its inputs. For instance, a relation defines a table with a schema. A table may contain one or many rows, or none. If present, each row in the table conforms to the same predefined schema from the operator. A relational operator may be an input to its parent relational operator, which recursively defines an operator tree. A set of commonly used relational operators include but not limited to the following: 1) Finding the common intersections for two or more input relations, i.e., Join; 2) Merging all input relations into one relation, i.e., Union; 3) Filtering an input relation with a predicate, i.e., Select; 4) Grouping an input relation by value, i.e., GroupBy; 5) Adding a new column to each input row of the relation, i.e., Project; 6) Read an input from storage medium, i.e., Scan. Notice that in order to evaluate a query, different query trees might be able to achieve the same results, e.g., perform Union of two relations then Select a part of the result by a predicate, or alternatively, apply the predicate (Select) first on each of the two input relations, then Union the filtered results. In this example, while the results of the two query trees are the same, the two alternative execution orders might have disparate performance during evaluation.

By default, an operator might operate in serial mode, i.e., the whole input data is consumed by one operator and an output is produced. Often times, this is not possible nor efficient due to the sheer amount of data typically operated in the cloud computing system. An operator may be operated in a parallel mode. The computing system could spawn multiple copies of the same operator, each processing a subportion of the input relation, i.e., parallel execution. During the optimization, optimizer decides whether it should schedule a parallel execution for an operator and if so, decide how many clones it will spawn. Notice that a parallel execution does not necessarily yield a better performance and is not necessarily less of an execution burden compared to its serial counterpart. For instance, there is a tradeoff between whether the system should take advantage of fast but scarce local storage or if it should dispatch more data to slow but ample remote storage. Such a tradeoff might exist in a typical configuration of a cloud computing environment.

Considering this, the execution burden factor of a query tree is defined as follows. An execution burden factor is an artificial number that captures the work needed to be done in order to produce the final output. An execution burden factor for a query tree consists of 1) the aggregated execution burden factor of all operators in the query tree; 2) the aggregated execution burden factor of moving data from and into remote storages. The execution burden factor of an operator is defined by the estimated time to execute the operator specific executable against a unit of data, multiplied the input data volume. The execution burden factor of data movement is defined by the amortized time to move a unit of data across network, multiplied by the data volume.

For each operator, the execution burden factor of processing a unit of data is known a priori as this is defined by the executable instructions. The execution burden factor of an operator is then dominated by the volume of data it needs to process as well as the locality of the data. In a cloud computing system, the bandwidth for interlinked computers is usually a reliable constant, i.e., the speed for moving a unit of data across network is predictable. Therefore, the execution burden factor of data movement is proportional to the data size being moved. Finally, in order to for optimizer to rank all query tree candidates by their execution burden factors, the optimizer has confident estimations on the volume of data input to and output from any operator.

The principles described herein improve the performance and accuracy of the query optimizer by having the query optimizer perform query optimization based on the actual data that the query is operating upon. That is, query optimization is performed not just as the data is input to the query, but based on data that results from one or more operations of the query itself. In particular, the query optimization is based on the distinctness of values of that data.

Figure 3:
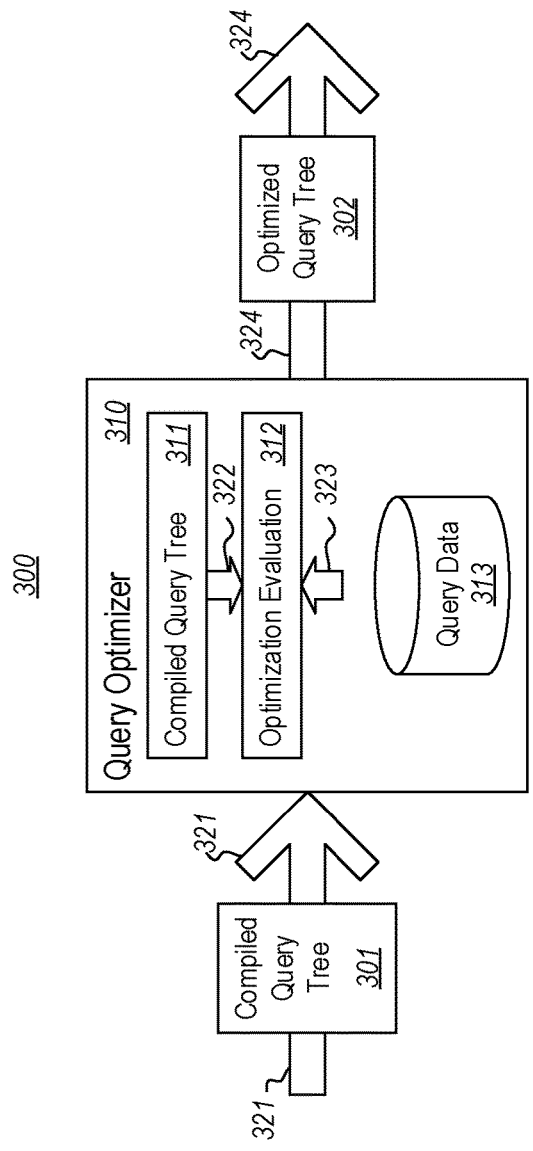
FIG. 3 illustrates a query optimization environment in more detail, and focuses in on the query optimization operation.
Figure 4:
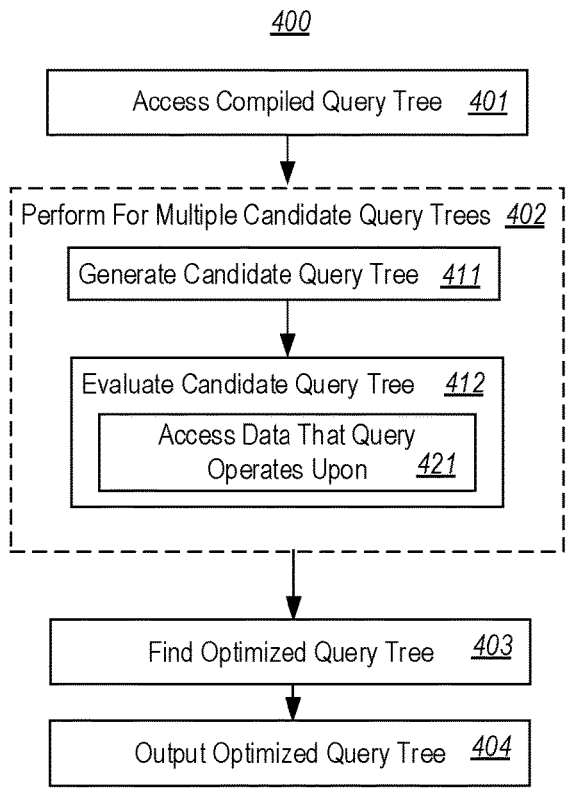
FIG. 4 illustrates a flowchart of a method for performing query optimization in accordance with the principles described herein.

Accordingly, FIG. 3 illustrates a query optimization environment 300 in more detail, and focuses in on the query optimization operation. The query optimization environment 300 includes a query optimizer 310. The query optimizer 310 represents one example of the query optimizer 212 of FIG. 2. FIG. 4 illustrates a flowchart of a method 400 for performing query optimization in accordance with the principles described herein. The method 400 may be performed by the query optimizer 310 of FIG. 3. Accordingly, the method 400 will not be described with frequent reference to the query optimizer 310 of FIG. 3. The method 400 may be performed for each query received by the query environment 200.

A query tree is first accessed from a query compiler (act 401). For instance, in FIG. 3, a query optimizer 310 receives the compiled query tree 301 (as represented by the arrow 321). The compiled query tree 301 is an example of the compiled query tree 202 of FIG. 2. Each of the candidate query trees has multiple leaf nodes, where leaf node represents input data into the query, and each parent node represents operations to be performed on data flows received from the child nodes. Alternatively, a query tree may be represented in which the nodes represent the data flows, and the connections between nodes represent operations. For purposes of the claims, these two alternatives are the same as the computing system views them in the same way in terms of the output by the top operator.

Figure 8:
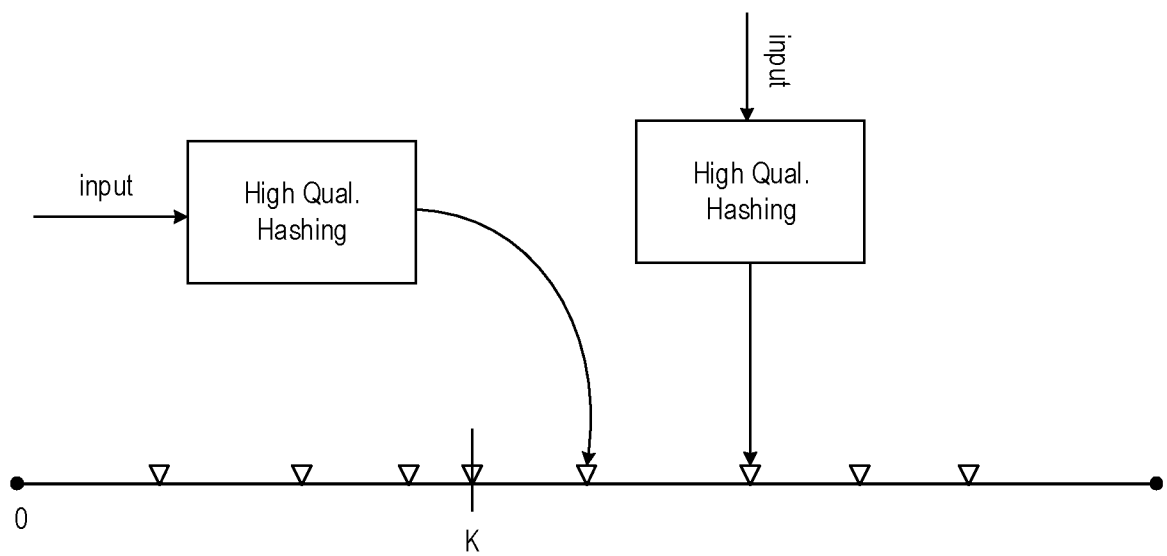
FIG. 8 illustrates a data structure that can propagate up a query tree

During optimization, the optimizer maintains a mutable data structure that is used to estimate the value of distinct value as the data flow through operators in a query tree from input to output. The data structure is first obtained in a preparation query, which scans the input data set. FIG. 8 illustrates one embodiment of such data structures. During the scan, the system employs a high quality, high efficient hash function, dubbed H herein, which hashes the input data to a real number between 0 and 1. The hash values generated by H are random enough such that an observer should witness that the hashes are evenly spread across the domain between 0 and 1. Since the same input will be hashed to the same real number by the hash function, every distinct real number obtained by the hash function is correspondent to at least one distinct input. By calibrating the density between the adjacent hash values, the optimizer can estimate how distinct the input data is. Even better, since H is of high quality, the spacing between adjacent hashes can be expected to have a small variance. Therefore, it is sufficient for the optimizer to only track the smallest k hash values. One part of the data structure used for tracking distinct value propagation during query optimization is the k hash values obtained from the preparation query.

Each operator during query optimization maintains one aforementioned data structure for distinct value estimation. The optimizer uses the following equation to obtain distinct value estimation. Let the kth smallest hash value in the data structure be $h_k$, the estimation for distinct value count is $k/h_k$. The estimation is of high quality if the hash values are of high quality. Given the distinctness estimation, optimizer makes educated estimation for the data volume processed by each operator in the operator tree, which, as previously described, eventually gets translated into execution burden factors for ranking candidate query trees.

The data structure of FIG. 8 can propagate through common operators in a query tree. Using the operators defined above for example, there are mainly four types of operator specific propagations for the data structure, summarized below in the table. The table uses distinct value estimator (dubbed Dv Estimator) to delegate the data structure for distinct value estimation.

| Operator | (Re)Definition for Dv Estimator Propagation in Query Tree |
|---|---|
| Scan | Leaf level estimator is generated by a preparation query, which builds the estimator for the input relation. |
| Union | Assume a union operates on m inputs from children, and each child has its own dv estimator with k hashes. Sort the k*m hash values, take the smallest k hash values to be the new estimator for the Union operator. |
| Join | A simple join finds intersection of two children. Assume each child has k hash values. Intersect the two set of hashes and find the common ones. The intersection has no more than k hashes. If less than k, extrapolate the set of hashes with the same density, until the k hashes are obtained. |
| Select | If the predicate of selection is "equal to a constant". Define a new estimator with k = 1 and the sole hash value being the hash of the constant. If the predicate of selection is "greater or less than", the estimator reuses the input estimator from the child. If the predicate of selection is "not equal to a constant", check if the hash of the constant is in the child's estimator, if so, remove it and extrapolate a new hash value from the density of remaining k − 1 hashes. If not, no-op and reuse the estimator from the child. |
| GroupBy | Reuse the estimator from child. |

A candidate optimized query tree is generated (act 411) and evaluated (act 412). The computing system adopted a rule-base optimizer. During optimization, a set of rules are applied to each operator in the input tree. If successfully applied, the application of a rule on an operator results in an equivalent substitute of operator. A substitute could be a single operator, or it could be a mini query tree. Optimizer then recursively applies rules to the newly generated substitute until convergence or no new substitute is generated. During the process, optimizer constructs new distinct value estimator(s) for the operator(s) in the newly generated substitute, according to the strategy illustrated in the aforementioned table. Jointly using estimator with other statistics annotated and propagated in the tree, optimizer computes the new execution burden factors for the substitute.

Figure 9A:
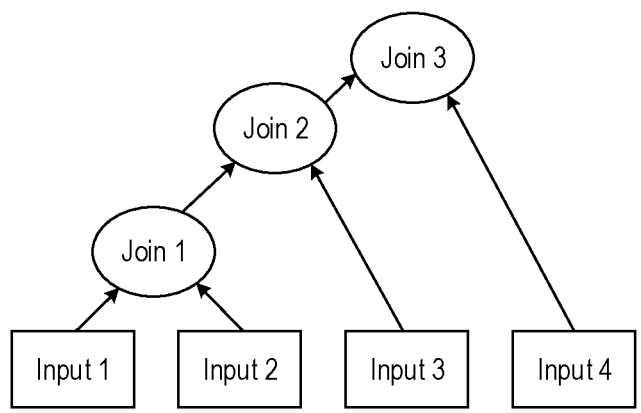
FIGS. 9A and 9B are examples of query trees that show the propagation up a query tree.
Figure 9B:
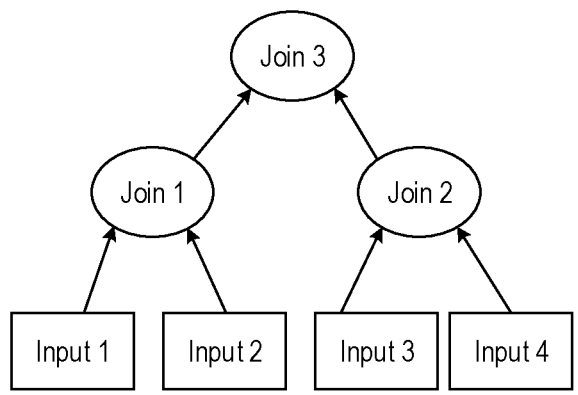

One example to showcase the effect of the propagated estimator is illustrated in FIGS. 9A and 9B. The two candidate query trees compute the same output for three joins (i.e., intersections) for four inputs. Assume the join for input1 and input2 produces a tiny amount of data, but a join between input3 and input4 does not. In FIG. 9A, all three joins reduces data, while in the query tree in FIG. 9B, 2 out of 3 joins reduce data. By using propagated estimator, optimizer knows that the distinct values in the chain of joins in FIG. 9A are reducing, and so as the data volume. Hence the candidate query tree in FIG. 9A has a smaller execution burden factor than the candidate query tree in FIG. 9B.

As represented by box 402, the generation and evaluation of candidate query trees may be performed for multiple candidate query trees. For instance, in FIG. 3, the query optimizer 310 includes a candidate query tree generation component 311 that generates candidate query trees that represent possible optimized query trees that are based on the compiled query tree. The candidate query trees are provided (as represented by arrow 322) to an optimization evaluation component 312 that evaluates whether or not the candidate query tree results in improved performance.

In order to make that evaluation, the optimization evaluation component accesses the data (act 421). For instance, in FIG. 3, the optimization evaluation component 312 has access (as represented by arrow 323) to the data 313 upon which the query is to execute. A sophisticated distinctness analysis is made not only on the data 313, but the results of one, some or all of the query operation results as performed on the data 313, to determine an appropriately optimized query tree. As an example, the data 313 may be a database, with input data to any particular leaf node of the candidate query tree being a portion (e.g., a table, a column, a collection of columns, and so forth) of that database.

Once an appropriately optimized candidate query tree is found (act 403) after evaluating one or more of the candidate optimized query trees, that optimized query tree is output (act 404). For instance, in FIG. 3, once the optimization evaluation component 312 finds an appropriately optimized query tree, the query optimizer outputs (as represented by arrow 324) the optimized query tree (e.g., the optimized query tree 302). The optimized query tree 302 is an example of the optimized query tree 203 of FIG. 2.

Figure 5:
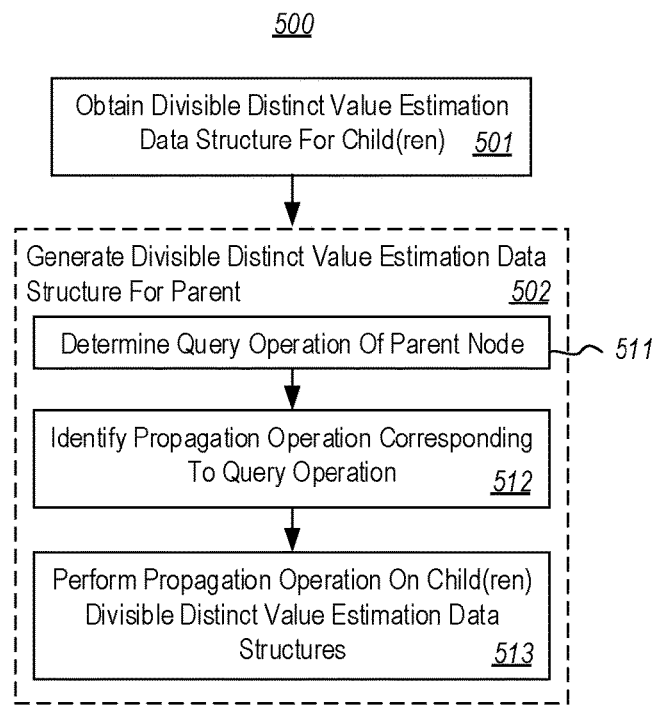
FIG. 5 illustrates a flowchart of a method for propagating divisible distinct value estimation data structures up a query tree.

FIG. 5 illustrates a flowchart of a method 500 for propagating divisible distinct value estimation data structures up a query tree. This method 500 may be performed in order to obtain distinct value estimation data structures for each of multiple nodes of a query tree, including non-leaf nodes. The method 500 of FIG. 5 may be performed each time a divisible distinct value estimation data structure is propagated to a parent node from its one or more child nodes in the candidate query tree.

First, distinct value estimation data structures are obtained for each of the child node(s) (act 501) that are to be used to propagate a distinct value estimation data structure to a parent node. The distinct value estimation data structures are such that that they are generated based on underlying data, and the distribution of values within the distinct value estimation data structure may be used to estimate the number of distinct values of the underlying data set. The distinct value estimation data structure also has the property in that it may be divided and still have a similar distribution that is used to estimate a similar number of district values. An example of such a data structure is a K minimum hash values synopsis.

A divisible distinct value estimation data structure is generated for a parent node of the candidate query tree (act 502) from the distinct value estimation data structures of at least one, some or all of the of child node(s) of the parent node. This is performed for one, some or all of the parent nodes that have child node(s) in the candidate query tree. Accordingly, divisible distinct value estimation data structures are at least partially propagated up the candidate query tree to generate at least one non-leaf node divisible distinct value estimation data structure for a non-leaf node of the candidate query tree.

The propagation includes performing a propagation operation on the divisible distinct value estimation data structure(s) of the child(ren) node(s) to the parent node. The propagation operation corresponds to the query operation represented by the parent node. In other words, the query operation of a query tree parent node maps to a particular propagation operation. In some cases, a propagation operation may be the same as a query operation. In other cases, a propagation operation is different than the query operation. For instance, the following chart illustrates correlations between particular query operators and corresponding propagation operations.

Accordingly, the act 502 includes determining the query operation to be propagated to (act 511), identifying a corresponding propagation operation (act 512), and then performing the propagation operation on the divisible distinct value estimation data structures of the child(ren) divisible distinct value estimation data structures (act 513). This results in a divisible distinct value estimation data structure being generated for the parent.

Thus, when a query comprises multiple query operations (examples of which provided in the table previously), multiple different propagation operations may be performed to propagate a divisible distinct value estimation data structure up a candidate query tree. An example of such propagation operations for each of different example operations is also outlined in the table above. FIGS. 6A through 6D show just one example of a candidate query tree 600 in various respective states 600A through 600D. The candidate query tree 600 is just one example of a candidate query tree. The principles described herein may operate regardless of the specific form of the candidate query trees. In this particular example, the candidate query tree 600 has ten nodes 601 through 610. Four of the nodes 601 through 604 are leaf nodes in the tree and represent input data to the query. The remainder of the nodes 605 through 610 represent operations. The shape of each non-leaf node 605 through 610 represents a different type of query operation. In this example case, only non-leaf nodes 605 and 606 represent a same query operator, as symbolized by each of the nodes 605 and 606 being a same shape. The remainder of the non-leaf nodes are a different shape, representing that each of the other non-leaf query operators 607 through 610 are different.

Figure 6A:
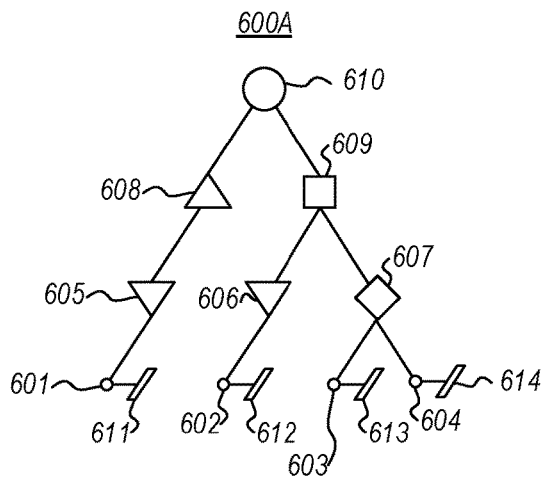
FIGS. 6A through 6D show just one example of a candidate query tree in various respective successive states of propagation of a divisible distinct value estimation data structure.

FIG. 6A illustrates the example candidate query tree in an initial state 600A. Each of the leaf nodes 601 and 604 has a corresponding a divisible distinct value estimation data structure 611 through 614 (represented as a parallelogram). One, some or all of the distinct value estimation data structures 611 through 614 may each have been generated ahead of time well ahead of the query. Alternatively, one some or all of the distinct value estimation data structures 411 may have be generated when the query had been received. Several examples of why a divisible distinct value estimation data structure component might not have already been generated are 1) the input data is not used often, 2) the input data has changed recently since the last time a divisible distinct value data structure was generated, or 3) the input data is distributed and thus the distinct value estimation data structure is generated based on distinct value estimation data structures of the constituent parts of that input data.

Figure 6B:
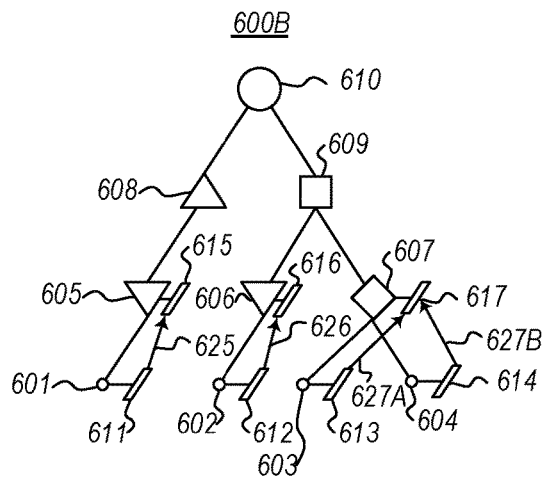

FIG. 6B illustrates a state 600A of the propagation after three performances of the method 500 of FIG. 5. In particular, a divisible distinct value estimation data structure 615 has been generated for the non-leaf node 605 by performing a propagation operation (represented by arrow 625) that corresponds to the operation 605 and that uses the divisible distinct value estimation data structure 611 as an input. Furthermore, a divisible distinct value estimation data structure 616 has been generated for the non-leaf node 606 by performing a propagation operation (represented by arrow 626) that corresponds to the operation 606 and that uses the divisible distinct value estimation data structure 612 as an input. Since the query operations 605 and 606 are the same, the propagation operations (as represented by the arrows 625 and 626) are also the same. Also, a divisible distinct value estimation data structure 617 has been generated for the non-leaf node 607 by performing a propagation operation (represented by arrow 627A and 627B) that corresponds to the operation 607 and that uses the divisible distinct value estimation data structures 613 and 614 as an input.

Figure 6C:
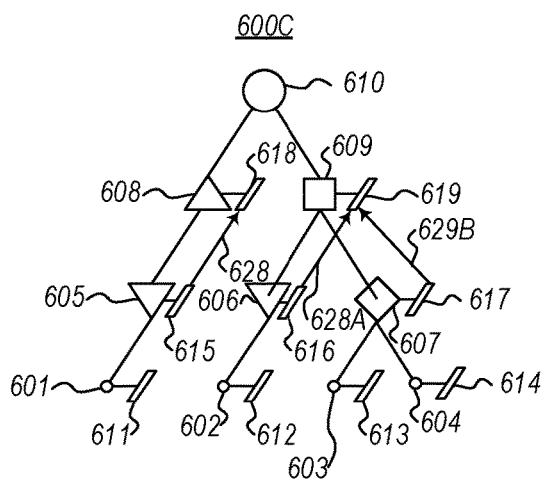

FIG. 6C illustrates a state 600C of propagation after two further performances of the method 500 of FIG. 5. In particular, a divisible distinct value estimation data structure 618 has been generated for the non-leaf node 608 by performing a propagation operation (represented by arrow 628) that corresponds to the operation 608 and that uses the divisible distinct value estimation data structure 615 as an input. Also, a divisible distinct value estimation data structure 619 has been generated for the non-leaf node 609 by performing a propagation operation (represented by arrows 629A and 629B) that corresponds to the operation 609 and that uses the divisible distinct value estimation data structures 616 and 617 as an input.

Figure 6D:
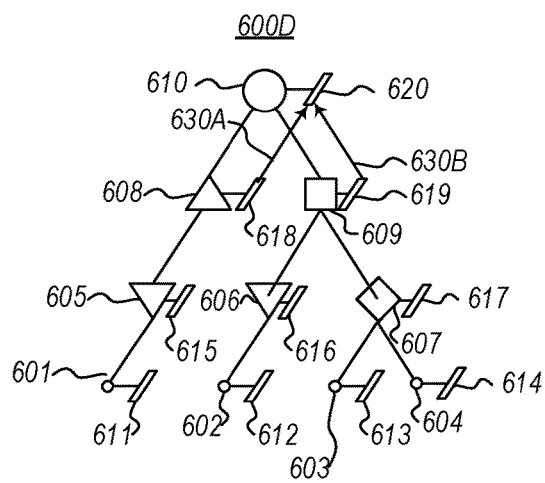

FIG. 6D illustrates a state of propagation after one further performance of the method 500 of FIG. 5. In particular, a divisible distinct value estimation data structure 620 has been generated for the non-leaf node 610 by performing a propagation operation (represented by arrows 630A and 630B) that corresponds to the operation 610 and that uses the divisible distinct value estimation data structures 618 and 619 as an input. In the example of FIG. 6D, the divisible distinct value estimation data structure has been propagated all of the way to the root node 610 of the candidate query tree. However, this will not always and may often not be the case. In the example of FIGS. 6A through 6D, the propagation operations are illustrated as being performed completely for one tier, then for the next, and so forth to the root node. However, this is not required. The propagation operations may be performed in any order so long as the divisible distinct value estimation data structures are generated for at least those child(ren) node(s) that are used to be used as input to generate the divisible distinct value estimation data structure for the parent node.

For some query operations, there may simply not be a suitable propagation operation for use in propagating the divisible distinct value estimation data structure. However, to propagate the distinct value estimation data structure further than might otherwise be possible, assumptions may be made to allow for further propagation. These assumptions might be true, but might not be true. Accordingly, alternatively or in addition, confidences may be associated with the divisible distinct value estimation data structures of each non-leaf node. Such confidence levels may also be considered when evaluating the candidate query tree as a suitable optimization.

Figure 7:
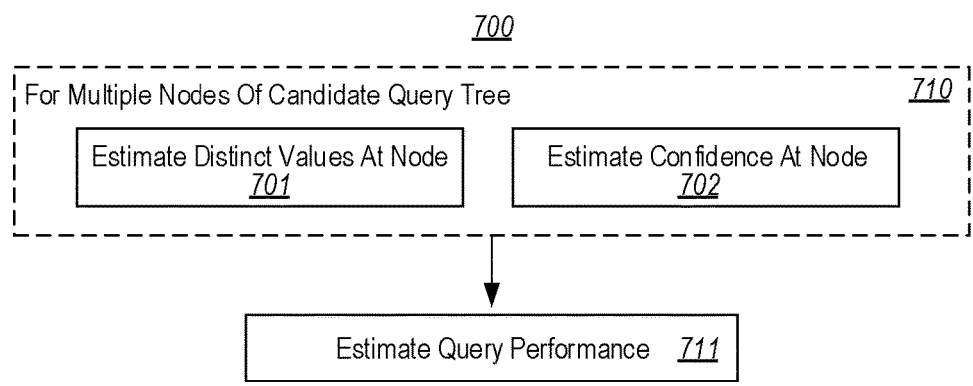
FIG. 7 illustrates a flowchart of a method 700 for evaluated a candidate query tree as a suitable optimization.

FIG. 7 illustrates a flowchart of a method 700 for evaluated a candidate query tree as a suitable optimization. First, the number of distinct values of the data at each of the nodes is estimated (act 701). This may be performed for each node including leaf nodes or non-leaf nodes (as represented by the box 710). Optionally, a confidence level of that estimation may also be determined (act 702) based on a confidence associated with that node. A query performance is then estimated based at least in part on the estimated number of distinct values and confidences, if any, for the various query operations (act 711).

The principles described herein may be applied to performing optimization of queries for distributed data as well. In that case, each portion of the input data may be distributed across multiple network locations. In that case, each data portion may itself have a corresponding divisible distinct value estimation data structure. In that case, generating a single divisible distinct value estimation data structure for the entire input data may be as simple as forming a propagation operation on a union operation.

Thus, the principles described herein may be applied to perform efficient and accurate query operation that is based on distinctness of data that is to be queried upon, not just as the data presently exists, but even as the data would result from one or more of the query operations. Furthermore, the principles described herein may operate even if the input data is distributed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, when executed by the one or more processors, the computer-executable instructions cause the computing system to perform at least the following:
accessing a query tree from a query compiler; and
evaluating at least one candidate query tree to select an optimized candidate query tree, each of the at least one candidate query tree having a plurality of leaf nodes, each leaf node of each candidate query tree representing data portions within a data store, the evaluation of each of at least some of the candidate query trees comprising the following:
for each of at least some of the plurality of leaf nodes of the candidate query tree, acquiring a divisible distinct value estimation data structure that was generated from the data portion represented by the leaf node;
at least partially propagating the divisible distinct value estimation data structures up the candidate query tree to generate at least one first non-leaf node divisible distinct value estimation data structure for a first non-leaf node of the candidate query tree that corresponds to a first query operation, and to generate at least one second non-leaf node divisible distinct value estimation data structure for a second non-leaf node of the candidate query tree that corresponds to a different query operation, the propagation comprising performing a first propagation operation corresponding to the first query operation to generate the first non-leaf node divisible distinct value estimation data structure and performing a different second propagation operation corresponding to the second query operation to generate the second non-leaf node divisible distinct value estimation data structure; and
evaluating query optimization of the candidate query tree using at least one or more of the at least one non-leaf node divisible distinct value estimation data structure, the query optimization for a particular non-leaf node being performed by:
  estimating a number of distinct values of data represented by the particular non-leaf node by using the divisible distinct value estimation data structure; and
  estimating query performance related to the non-leaf node using the estimated number of distinct values of data represented by the particular non-leaf node.

2. The computing system in accordance with claim 1, the data store comprising a database.

3. The computing system in accordance with claim 1, the act of at least partially propagating the divisible distinct value estimation data structures up the query tree comprising the following for at least a particular candidate query tree:
  propagating a divisible distinct value estimation data structure to a parent node of the candidate query tree from a plurality of child nodes of the parent node, the propagating comprising performing an operation on a divisible distinct value estimation data structure of the child nodes of the parent node to generate a divisible distinct value estimation data structure of the parent node.

4. The computing system in accordance with claim 3, the operation performed on the divisible distinct value estimation data structures of the child nodes being a same operation as an operation that is represented by the parent node.

5. The computing system in accordance with claim 3, the operation performed on the divisible distinct value estimation data structures of the child nodes being a different operation as an operation that is represented by the parent node.

6. The computing system in accordance with claim 3, the divisible distinct value estimation data structure of each of the child nodes and the parent node comprising a K minimum hash values synopsis.

7. The computing system in accordance with claim 3, the propagation involving making at least one assumption to permit the propagation to occur.

8. The computing system in accordance with claim 7, the propagation further comprising propagating a confidence associated with the divisible distinct value estimation data structure, the confidence at the parent node being reduced due to the at least one assumption, the confidence also being considered when evaluating the candidate query tree for optimization.

9. The computing system in accordance with claim 1, the at least one candidate query tree comprising a plurality of candidate query trees.

10. The computing system in accordance with claim 1, the computer-executable instructions also causing the computing system to perform at least the following for at least a particular candidate query tree of the at least some of the candidate query trees:
  generating a divisible distinct value estimation data structure from a particular data portion represented by a particular leaf node of the particular candidate data structure.

11. The computing system in accordance with claim 10, the generating occurring prior to accessing the query tree.

12. The computing system in accordance with claim 10, the generating occurring after accessing the query tree.

13. The computing system in accordance with claim 10, the generating comprising:
  for each of a plurality of subportions of the particular data portion, acquiring a divisible distinct value estimation data structure that was generated from the subportion; and
  generating the divisible distinct value estimation data structure for the particular leaf node using the district value estimation data structures of the plurality of subportions of the particular data portion.

14. The computing system in accordance with claim 1, the generated divisible distinct value estimation data structure being used for multiple query trees received from the query compiler.

15. The computing system in accordance with claim 1, each of at least some of the data portions being a column of a table.

16. A method for performing query optimization, the method comprising:
  accessing a query tree from a query compiler; and
  evaluating at least one candidate query tree to select an optimized candidate query tree, each of the at least one candidate query tree having a plurality of leaf nodes, each leaf node of each candidate query tree representing data portions within a data store, the evaluation of each of at least some of the candidate query trees comprising the following:
    for each of at least some of the plurality of leaf nodes of the candidate query tree, acquiring a divisible distinct value estimation data structure that was generated from the data portion represented by the leaf node;
    at least partially propagating the divisible distinct value estimation data structures up the candidate query tree to generate at least one first non-leaf node divisible distinct value estimation data structure for a first non-leaf node of the candidate query tree that corresponds to a first query operation, and to generate at least one second non-leaf node divisible distinct value estimation data structure for a second non-leaf node of the candidate query tree that corresponds to a different query operation, the propagation comprising performing a first propagation operation corresponding to the first query operation to generate the first non-leaf node divisible distinct value estimation data structure and performing a different second propagation operation corresponding to the second query operation to generate the second non-leaf node divisible distinct value estimation data structure; and
    evaluating query optimization of the candidate query tree using at least one or more of the at least one non-leaf node divisible distinct value estimation data structure, the query optimization for a particular non-leaf node being performed by:
      estimating a number of distinct values of data represented by the particular non-leaf node by using the divisible distinct value estimation data structure; and
      estimating query performance related to the non-leaf node using the estimated number of distinct values of data represented by the particular non-leaf node.

17. The method in accordance with claim 16, further comprising the following for at least a particular candidate query tree of the at least some of the candidate query trees:
  generating a divisible distinct value estimation data structure from a particular data portion represented by a particular leaf node of the particular candidate data structure.

18. The method in accordance with claim 16, the generating comprising:

for each of a plurality of subportions of the particular data portion, acquiring a divisible distinct value estimation data structure that was generated from the subportion; and generating the divisible distinct value estimation data structure for the particular leaf node using the district value estimation data structures of the plurality of subportions of the particular data portion.

19. A computer program product comprising one or more computer-readable storage media having thereon computer-executable instructions that are structured such that, when executed by one or more processors of a computing system, the computing system is caused to perform at least the following:

accessing a query tree from a query compiler; and evaluating at least one candidate query tree to select an optimized candidate query tree, each of the at least one candidate query tree having a plurality of leaf nodes, each leaf node of each candidate query tree representing data portions within a data store, the evaluation of each of at least some of the candidate query trees comprising the following:

for each of at least some of the plurality of leaf nodes of the candidate query tree, acquiring a divisible distinct value estimation data structure that was generated from the data portion represented by the leaf node;

at least partially propagating the divisible distinct value estimation data structures up the candidate query tree to generate at least one first non-leaf node divisible distinct value estimation data structure for a first non-leaf node of the candidate query tree that corresponds to a first query operation, and to generate at least one second non-leaf node divisible distinct value estimation data structure for a second non-leaf node of the candidate query tree that corresponds to a different query operation, the propagation comprising performing a first propagation operation corresponding to the first query operation to generate the first non-leaf node divisible distinct value estimation data structure and performing a different second propagation operation corresponding to the second query operation to generate the second non-leaf node divisible distinct value estimation data structure; and evaluating query optimization of the candidate query tree using at least one or more of the at least one non-leaf node divisible distinct value estimation data structure, the query optimization for a particular non-leaf node being performed by:

estimating a number of distinct values of data represented by the particular non-leaf node by using the divisible distinct value estimation data structure; and estimating query performance related to the non-leaf node using the estimated number of distinct values of data represented by the particular non-leaf node.

\* \* \* \* \*